(12) United States Patent
Bayati et al.

(10) Patent No.: US 7,885,269 B2
(45) Date of Patent: Feb. 8, 2011

(54) NETWORK ANALYSIS WITH STEINER TREES

(75) Inventors: Mohsen Bayati, Cambridge, MA (US);
Christian H. Borgs, Boston, MA (US);
Alfredo Braunstein, Chieri (IT);
Jennifer T. Chayes, Boston, MA (US);
Riccardo Zecchina, Turin (IT)

(73) Assignee: Microsoft Corporation, Redmond, WA (US)

( * ) Notice: Subject to any disclaimer, the term of this patent is extended or adjusted under 35 U.S.C. 154(b) by 123 days.

(21) Appl. No.: 12/147,536

(22) Filed: Jun. 27, 2008

(65) Prior Publication Data

US 2009/0222782 A1    Sep. 3, 2009

Related U.S. Application Data

(60) Provisional application No. 61/033,214, filed on Mar. 3, 2008.

(51) Int. Cl.
*H04L 12/28* (2006.01)
(52) U.S. Cl. ............................. 370/395.32; 370/395.31; 370/389; 370/392; 370/466; 370/474
(58) Field of Classification Search ................. 370/248, 370/254, 255, 256, 257, 258, 351, 352, 400, 370/395.3, 395.31, 401, 402, 407, 408, 409, 370/410; 709/223–226, 238–244, 252
See application file for complete search history.

(56) References Cited

U.S. PATENT DOCUMENTS 5,291,477 A * 3/1994 Liew ......................... 370/238

| 5,355,371 | A  | * | 10/1994 | Auerbach et al. | ............ | 370/255 |
| 5,831,975 | A  | * | 11/1998 | Chen et al.     | .................. | 370/256 |
| 6,088,333 | A  | * | 7/2000  | Yang et al.     | .................. | 370/238 |
| 6,154,463 | A  |   | 11/2000 | Aggarwal et al. |             |         |
| 6,289,495 | B1 |   | 9/2001  | Raspopovic et al. |           |         |
| 6,310,883 | B1 |   | 10/2001 | Mann et al.     |             |         |
| 6,505,331 | B1 | * | 1/2003  | Bracha et al.   | ................. | 716/12  |
| 6,591,411 | B2 |   | 7/2003  | Alpert et al.   |             |         |

(Continued)

FOREIGN PATENT DOCUMENTS

WO    WO2006002665    *    1/2006

OTHER PUBLICATIONS

Gamarnik et al.; Belief Propagation for Min-Cost Network Flow: Convergence & Correctness; Jan. 2010; Proceedings of the Twenty-first Annual ACM-SIAM Symposium on Discrete Algorithms; pp. 279-292.*

(Continued)

*Primary Examiner*—Pankaj Kumar
*Assistant Examiner*—Mark A Mais
(74) *Attorney, Agent, or Firm*—L. Alan Collins; Collins & Collins Incorporated

(57) ABSTRACT

Networks may be analyzed using Steiner trees. In an example embodiment, a method includes acts of receiving, accepting, creating, and analyzing. Data specifying a network is received. Steiner tree parameters are accepted. A Steiner tree model is created on the data specifying the network responsive to the Steiner tree parameters. The Steiner tree model includes a local representation having a depth constraint for neighborhood vertices. The data specifying the network is analyzed to ascertain a Steiner tree solution based on the Steiner tree model, which includes the local representation, and using a locally-oriented combinatorial algorithm.

11 Claims, 9 Drawing Sheets

U.S. PATENT DOCUMENTS

| | | | |
|---|---|---|---|
| 6,717,921 | B1 | 4/2004 | Aggarwal et al. |
| 6,745,157 | B1 | 6/2004 | Weiss et al. |
| 6,826,606 | B2* | 11/2004 | Freeman et al. ............. 709/223 |
| 7,027,406 | B1* | 4/2006 | Shabtay et al. .............. 370/252 |
| 7,246,172 | B2 | 7/2007 | Yoshiba et al. |
| 7,454,038 | B1* | 11/2008 | Ruzon ........................ 382/107 |
| 7,499,413 | B2* | 3/2009 | Parham et al. ............. 370/256 |
| 2004/0004963 | A1* | 1/2004 | Mehra et al. ................ 370/392 |
| 2004/0199613 | A1* | 10/2004 | Hundscheidt et al. ....... 709/220 |
| 2005/0108071 | A1* | 5/2005 | Jain et al. ...................... 705/7 |
| 2006/0146716 | A1 | 7/2006 | Lun et al. |
| 2007/0047556 | A1* | 3/2007 | Raahemi et al. ........ 370/395.53 |

OTHER PUBLICATIONS

Bickson et al.; Modified Belief Propagation Algorithm for Energy Saving in wireless and Sensor Networks; Sep. 2005; Hebrew University School of Computer Science and Engineering; pp. 1-6.*

Komodakis et al.; Performance vs Computational Efficiency for Optimizing Single and Dynamic MRFs: Setting the State of the Art with Primal Dual Strategies; 2008; Computer Vis. Image Understanding; vol. 112(1): pp. 14-29.*

Bailly-Bechet et al.; A Prize-Collecting Steiner Tree Approach to Transduction Network Inference; 2009; Bioinformatics; vol. 5688, pp. 83-95.*

Bayati et al.; A Rigorous Analysis of the Cavity Equations for the Minimum Spanning Tree; 2008; Journal of Mathematical Physics; vol. 49(12); pp. 1-7.*

Wainwright et al.; Tree-reweighted Belief Propagation Algorithms and Approximate ML Estimation by Pseudo-Moment Matching; 2003; Proceedings of the Ninth International Conference on Artifical Intelligence and Staistics; pp. 1-8.*

Bayati et al.; Maximum Weight Matching for Max-Product Belief Propagation; 2005; International Symposium on Information Theory; pp. 1-5.*

International Search Report and Written Opinion for PCT Application No. PCT/US2009/034985, Microsoft Corporation, Mailed Sep. 29, 2009, 10 pages.

Abstract for Korean patent application publication No. KR2000034140(A), Jun. 15, 2000, Korea Telecommunication, inventor Kim Sang Baek, et al., provided by the European Patent Office, 1 page.

Bauer, et al., "Distributed Algorithms for Multicast Path Setup in Data Networks," version retrieved at <<http://www.fredbauer.com/pubs/>>, Transactions on Networking, vol. 4, No. 2, 1996, 5 pages.

Der-Rong Din, "Genetic Algorithm for Finding Minimal Cost Light Forest of Multicast Routing on WDM Networks", Research Article, Journal of Artificial Evolution and Applications, vol. 2008, Article ID 536913, pp. 1-20.

Yunnan Wu, "Network Coding for Multicasting", Jan. 2006, 246 pages.

Jinjing Jiang, "A Survey on Energy Efficient Routing in Wireless Networks", Survey Topic, pp. 1-12, Available at :—http://www.cse.wustl.edu/~jain/cse574-06/ftp/energy_routing/, 2008.

Robins, et al., "Tighter Bounds For Graph Steiner Tree Approximation", Siam J. Discrete Math., vol. 19, No. 1, pp. 122-134, 2005, Society for Industrial and Applied Mathematics.

Braunstein, et al., "Learning by message-passing in networks of discrete synapses", Dec. 9, 2005, pp. 1-4.

* cited by examiner

NETWORK ANALYSIS WITH STEINER TREES

CROSS-REFERENCE(S) TO RELATED APPLICATION(S)

This U.S. Nonprovisional Patent Application claims the benefit of copending U.S. Provisional Patent Application 61/033,214, filed on 3 Mar. 2008 and entitled "Optimization of Network Solutions". U.S. Provisional Patent Application 61/033,214 is hereby incorporated by reference in its entirety herein.

BACKGROUND

Network analysis is performed in a number of different fields. For example, network analysis is relevant to telecommunications. A telecommunications network usually includes many different nodes spanning a large geographical area. When a communication such as a telephone call is initiated, the telecommunications system decides how to route the communication from the origination point to the destination point via multiple nodes. An efficient selection of nodes can accelerate and/or reduce the cost of completion of the communication. The selection of the nodes to carry the communication may be made by performing a network analysis.

With one origination point and one termination point, the network analysis is relatively straightforward. There are, however, other communications with multiple origination points and/or multiple termination points. Network analysis in such situations becomes significantly more complicated. Such network analysis is computationally intensive at least partly because there are nodes in the telecommunications network that may or may not be selected for carrying the communication.

The so-called Steiner tree problem is applicable to these types of scenarios. Solving a Steiner tree problem can produce a routing that is satisfactory, if not optimal, for completing the communication among the many nodes that may possibly be used for interconnecting the origination and termination points. The Steiner tree problem is relevant to many different types of real-world networks in addition to telecommunication networks. Unfortunately, Steiner tree problems are notoriously difficult to solve, even with appreciable computational resources.

SUMMARY

Networks may be analyzed using Steiner trees. In an example embodiment, a method includes acts of receiving, accepting, creating, and analyzing. Data specifying a network is received. Steiner tree parameters are accepted. A Steiner tree model is created on the data specifying the network responsive to the Steiner tree parameters. The Steiner tree model includes a local representation having a depth constraint for neighborhood vertices. The data specifying the network is analyzed to ascertain a Steiner tree solution based on the Steiner tree model, which includes the local representation, and using a locally-oriented combinatorial algorithm.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other systems, methods, devices, media, apparatuses, arrangements, and other example embodiments are described herein.

BRIEF DESCRIPTION OF THE DRAWINGS

The same numbers are used throughout the drawings to reference like and/or corresponding aspects, features, and components.

DETAILED DESCRIPTION

Figure 1:
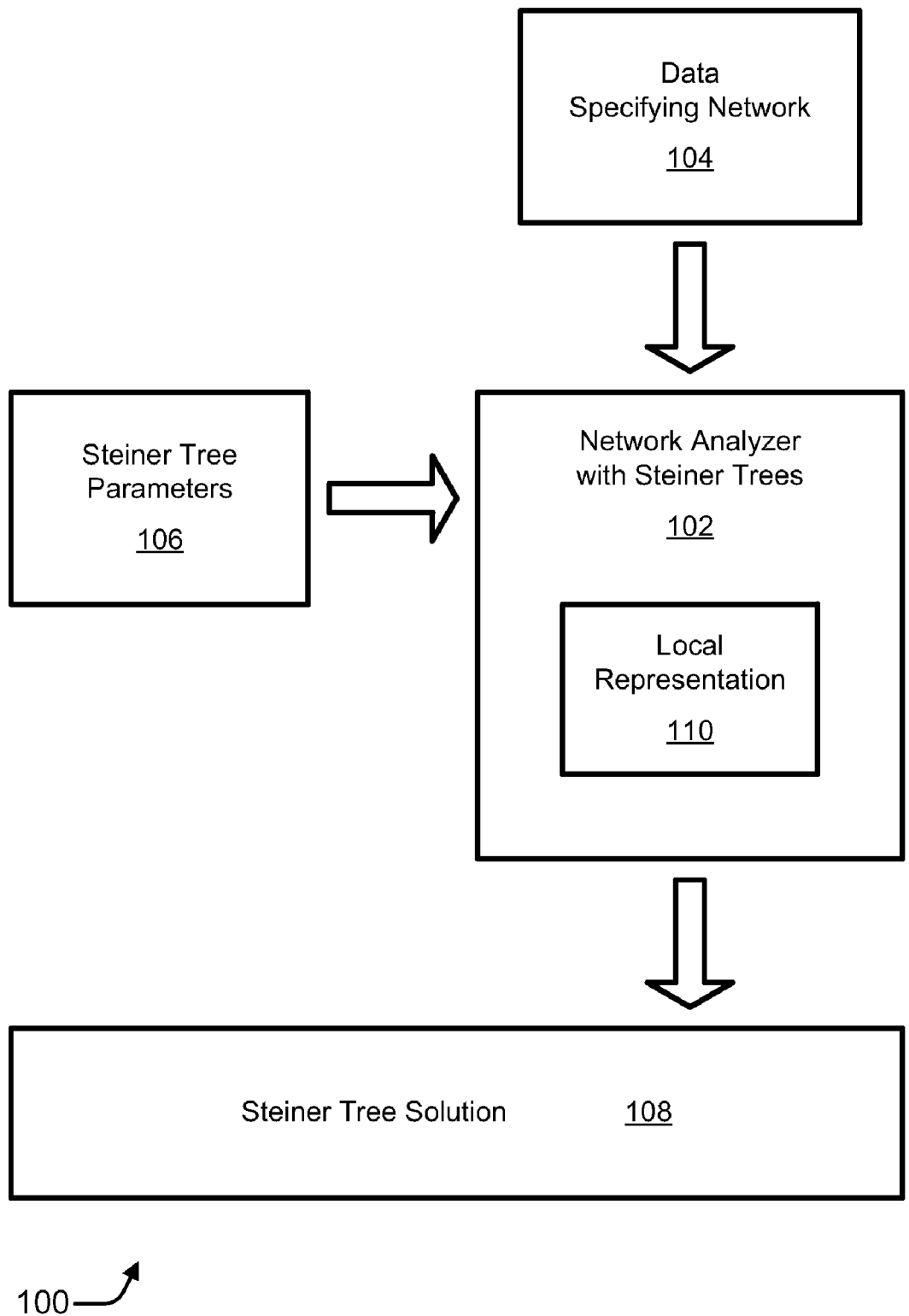
FIG. 1 is a block diagram illustrating an example network analysis with Steiner trees.

1: Introduction to Network Analysis with Steiner Trees

Solving a Steiner tree problem in the context of network analysis can produce a satisfactory, if not optimal, result. The Steiner tree problem, which is named after Jacob Steiner, is a problem in combinatorial "optimization". It is a well-known mathematical problem per se. The Steiner tree problem, in simple terms, may be set forth as follows: given a set of vertices of a graph and a designated subset of the vertices, interconnect the subset of vertices with a subgraph of minimum total weight. The total weight is the sum of the weights of each of the edges that interconnect the vertices of the subgraph. The vertices of the subgraph include the designated subset of vertices and may include any one or more other vertices selected from the overall set of vertices of the graph.

The Steiner tree problem has applications that include, but are not limited to, circuit layout or network design, communication network (e.g., Internet) broadcasting or multicasting, computational or network reconstruction for biology (e.g., for phylogenetic trees, for identifying regulatory sub-networks of a set of genes, etc.), power or water distribution network design, and so forth. Most versions of the Steiner tree problem are considered NP-complete, i.e.—they are thought to be computationally hard and difficult to approximate. In practice, heuristics are used to determine a solution that is "optimal". In other words, a particular solution may not be truly "optimal" in a purely logical or mathematical sense of the term, but the particular solution may nevertheless be acceptable as being sufficiently good.

One common approximation to the Steiner tree problem is to compute a minimum cost spanning tree on the designated subset of vertices that is guaranteed to produce a solution with a total weight that is at most twice the true optimum solution. The currently-best-known approach to the problem is from Robins and Zelikovsky (2005). Their approach produces a solution with a total weight that is at most 1.55 times the optimum. However, their approach requires a purely global, centralized scheme that is not suitable to parallel implementation.

In contrast, for certain example embodiments, Steiner tree problems may be solved using a localized scheme that is suitable for parallel implementation, including using distributed systems. A locally-oriented combinatorial algorithm may be employed. An example of a locally-oriented combinatorial algorithm is the belief propagation algorithm.

Example implementations may be distributed, stateless, and/or local. They may be distributed because each vertex may update its own beliefs independently of other vertices' computations. They may be stateless because each new belief may be computed based on the most-recently-obtained beliefs, with previous beliefs being discarded. Consequently, changes in network topology can be gracefully handled. They may be local because each vertex may focus the message passing on its neighbors. A vertex may obtain messages from its neighbors and communicate its beliefs to its neighbors.

In an example embodiment, an iterative technique is employed such that in each round each vertex sends to its neighboring vertices a probability vector that reflects its own belief(s) about (i) its position (e.g., its depth) in the tree from a fixed root and (ii) its parent vertex at that depth. Each vertex then proceeds to accumulate the belief vectors it obtains from its own neighbors and to re-estimate its beliefs based on the newly-obtained information. The technique then iterates until there is a convergence. Thus, for certain example embodiments, a message passing technique is used to solve Steiner tree problems in the context of network analysis.

2: Example Embodiments for Network Analysis with Steiner Trees

FIG. 1 is a block diagram illustrating an example network analysis 100 with Steiner trees. As illustrated, network analysis 100 includes a network analyzer 102 that uses Steiner trees, data specifying a network 104, Steiner tree parameters 106, and a Steiner tree solution 108. Network analyzer 102 includes a local representation 110.

In an example embodiment, data specifying a network 104 defines the vertices that form a network. The network may represent a real-world network such as one of those listed herein above (e.g., circuit, biological, communication, distribution, etc.). Steiner tree parameters 106 designate which of the vertices are to be included in the interconnected subgraph or subnetwork. These vertices are called terminal vertices. Steiner tree solution 108 describes the Steiner tree that is output as the solution. Example vertices, edges, and vertex types (including terminal vertices) are described herein below with particular reference to FIGS. 2A-2D.

In an example operation, data specifying a network 104 and Steiner tree parameters 106 are input to network analyzer 102. Network analyzer 102 is to create a Steiner tree model on data specifying a network 104 responsive to Steiner tree parameters 106. The Steiner tree model includes or is based on local representation 110. Local representation 110 has a depth constraint for neighborhood vertices. Examples of this depth constraint are described further herein below with particular reference to FIG. 5.

Network analyzer 102 is to analyze data specifying a network 104 to ascertain Steiner tree solution 108 using a locally-oriented combinatorial algorithm based on the Steiner tree model. Using a locally-oriented combinatorial algorithm to perform a network analysis with a Steiner tree enables distributed and/or parallel schemes to be employed. Network analyzer 102 outputs Steiner tree solution 108 (e.g., for transmission, storage, presentation to a user, etc.).

Figure 2A:
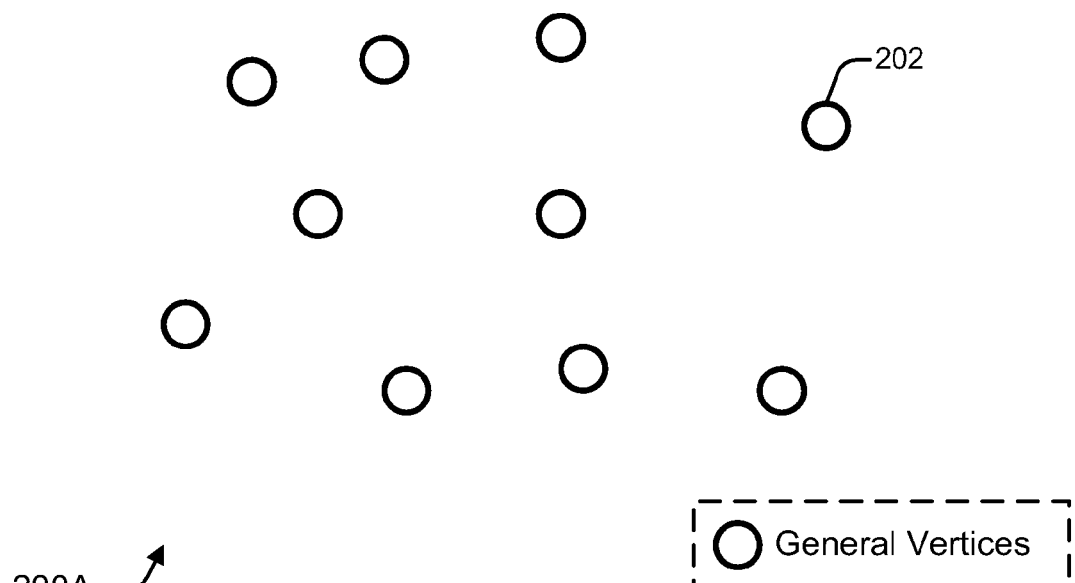
FIGS. 2A-2D depict graph diagrams that illustrate example vertex types for network analysis with Steiner trees.

FIGS. 2A-2D depict graph diagrams 200A-200D, respectively, that illustrate example vertex types for network analysis with Steiner trees. In FIG. 2A at graph 200A, multiple general vertices 202 are shown as circles. General vertices 202 are the total set of vertices existing or available in a network. Hence, data specifying a network 104 (of FIG. 1) may define general vertices 202.

Figure 2B:
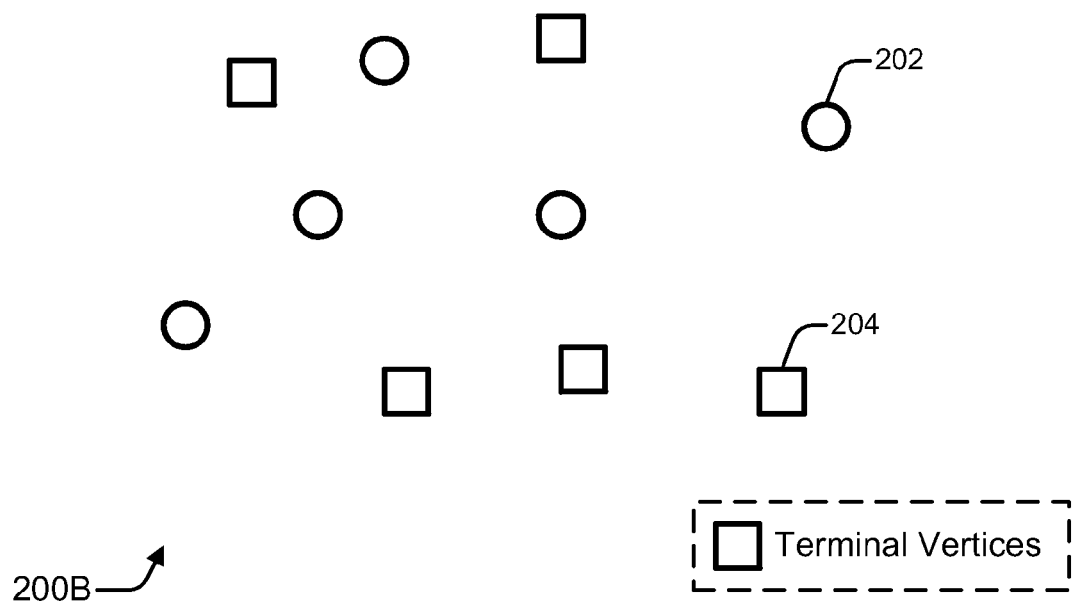

In FIG. 2B at graph 200B, some of general vertices 202 have been identified as terminal vertices 204. Terminal vertices 204 are shown as squares and are to be included in the Steiner tree solution. Hence, Steiner tree parameters 106 (of FIG. 1) may designate terminal vertices 204. It should be understood that a network represented by graphs 200A-200D may include a different number of total general vertices 202, different numbers of other vertex types, a different configuration, and so forth.

Figure 2C:
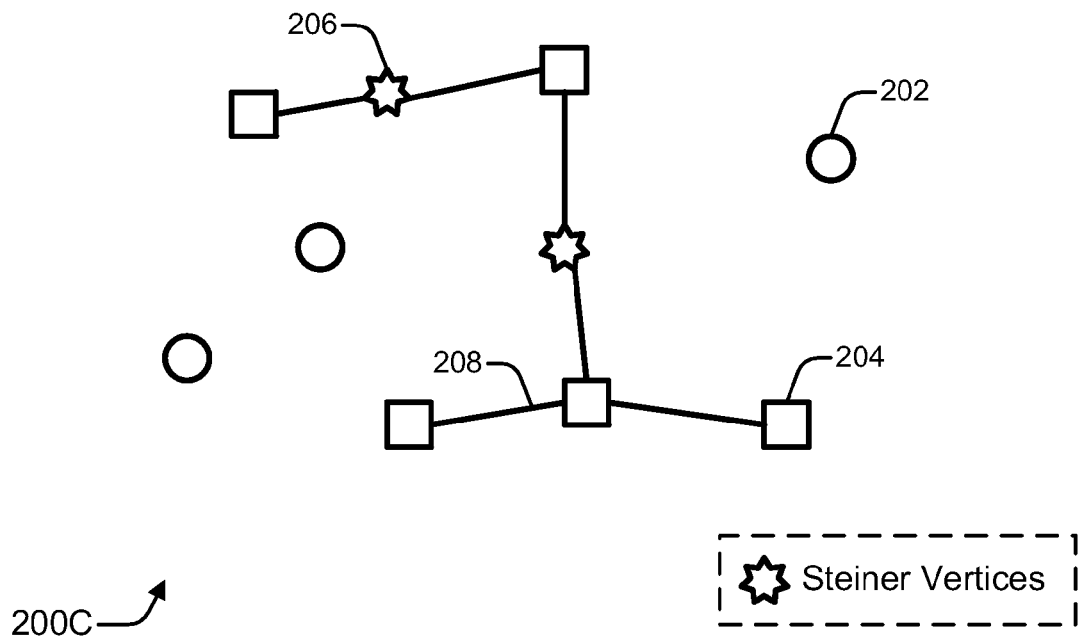

In FIG. 2C at graph 200C, some of the non-terminal general vertices 202 have been selected to be Steiner vertices 206. Steiner vertices 206 are shown as stars. Steiner vertices 206 are those general vertices 202 that are selected during the network analysis for use in interconnecting terminal vertices 204. Typically, general vertices 202 are selected to be Steiner vertices 206 in an effort to produce a low-weight Steiner tree solution. Terminal vertices 204 and Steiner vertices 206 are interconnected by edges 208. Each edge 208 usually has a corresponding weight (not explicitly shown in FIG. 2C). The sum of the weights of edges 208 that interconnect the Steiner tree is the total weight of the Steiner tree solution.

Figure 2D:
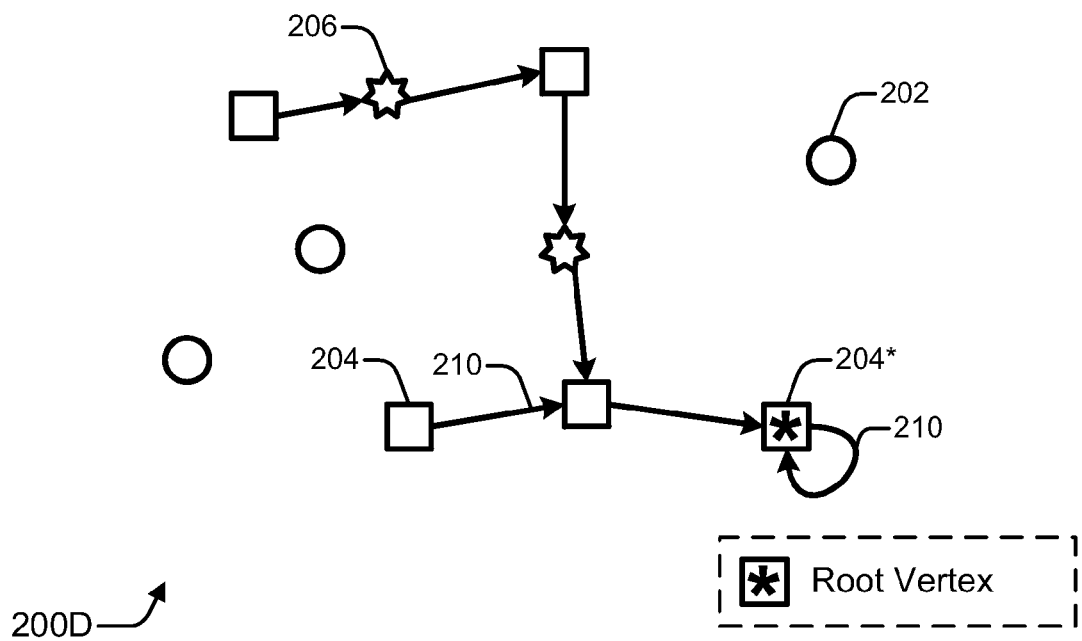

In FIG. 2D at graph 200D, an edge pointer 210 is associated with each edge 208 (not separately indicated in FIG. 2D). Each edge pointer 210 has a direction pointing from one (originating) vertex to another (distal) vertex. Graph 200D also indicates a root vertex 204*. In an example Internet multicasting implementation, root vertex 204* may be a node that initiates a multicasting session. By convention, root vertex 204* has an edge pointer 210 that points to itself. As shown, each edge pointer 210 points in a direction along the tree toward root vertex 204*. However, each edge pointer 210 may alternatively point in directions away from root vertex 204*.

Figure 3:
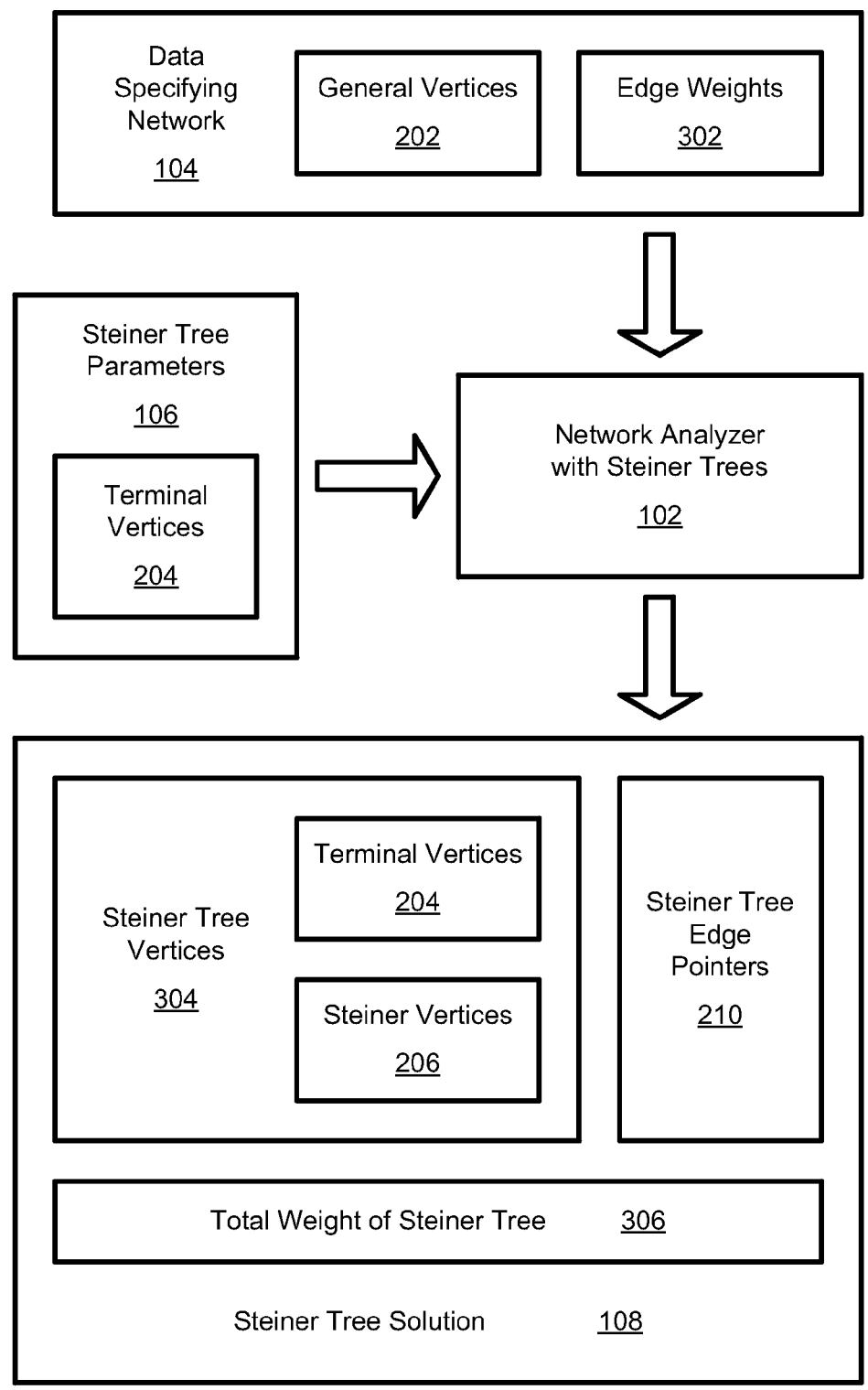
FIG. 3 is a block diagram of a network analysis with Steiner trees that illustrates additional example components.

FIG. 3 is a block diagram of a network analysis 300 with Steiner trees that illustrates additional example components. As illustrated, network analysis 300 includes network analyzer 102 that uses Steiner trees, data specifying a network 104, Steiner tree parameters 106, and Steiner tree solution 108. Data specifying a network 104, Steiner tree parameters 106, and Steiner tree solution 108 each includes one or more additional components that were not explicitly shown in network analysis 100 (of FIG. 1).

Specifically, data specifying a network 104 includes general vertices 202 and edge weights 302. Steiner tree parameters 106 include terminal vertices 204. Steiner tree solution 108 includes Steiner tree vertices 304, Steiner tree edge pointers 210, and a total weight 306 of the Steiner tree. Steiner tree vertices 304 of Steiner tree solution 108 include terminal vertices 204 and Steiner vertices 206.

In an example embodiment, data specifying a network 104 defines the network with general vertices 202 and edge weights 302 that correspond to the edges between any two of general vertices 202. Alternatively, data specifying a network 104 may define the network using edge indicators. Edge weights 302 may represent a cost, a length, a bandwidth, a delay, a QoS, a value, a reliability, some combination thereof, and so forth.

Steiner tree parameters 106 designate which of the vertices are to be included in the interconnected subgraph by identifying terminal vertices 204. Total weight 306 of the Steiner tree solution is the sum of a subset of edge weights 302 for the edges 208 that interconnect the subgraph that is produced by the network analysis. Specifically, it is the sum of the edge weights 302 that correspond to Steiner tree edge pointers 210.

Data specifying a network 104, Steiner tree parameters 106, and Steiner tree solution 108 may include different (e.g., fewer, more, and/or alternative) components than those that are illustrated. For example, data specifying a network 104 may include each possible edge 208 for the network being specified and edge weights 302 that are associated therewith. As another example, Steiner tree solution 108 may include Steiner tree edge pointers 210 while omitting Steiner tree vertices 304 and/or total weight 306 of the Steiner tree solution.

Figure 4:
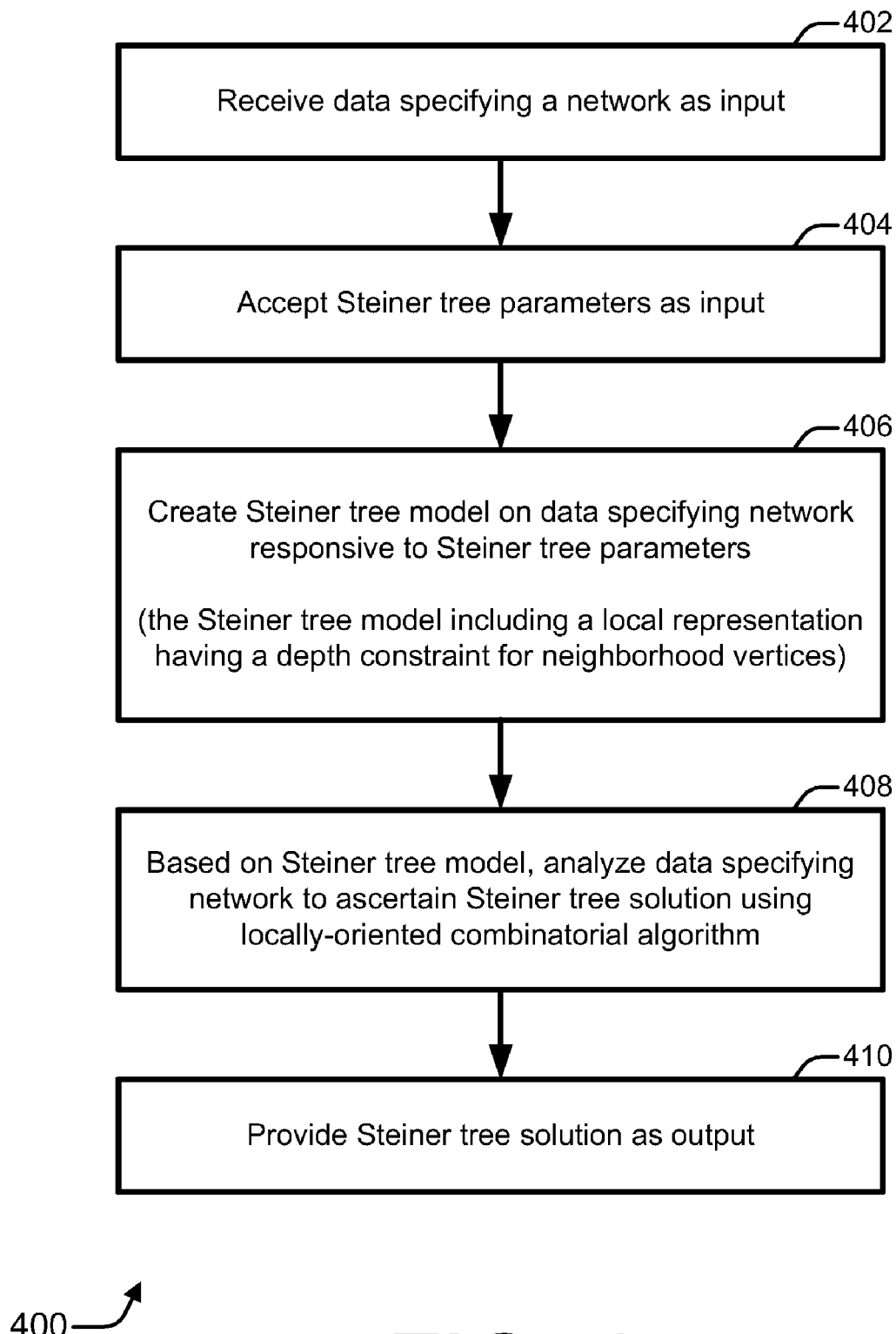
FIG. 4 is a flow diagram that illustrates an example of a general method for performing network analysis with Steiner trees.

FIG. 4 is a flow diagram 400 that illustrates an example of a general method for performing a network analysis with Steiner trees. Flow diagram 400 includes five blocks 402-410. Implementations of flow diagram 400 may be realized, for example, as processor-executable instructions and/or as part of network analysis 300 (of FIG. 3). Hence, example embodiments for implementing flow diagram 400 are described below with reference to FIG. 3.

Figure 8:
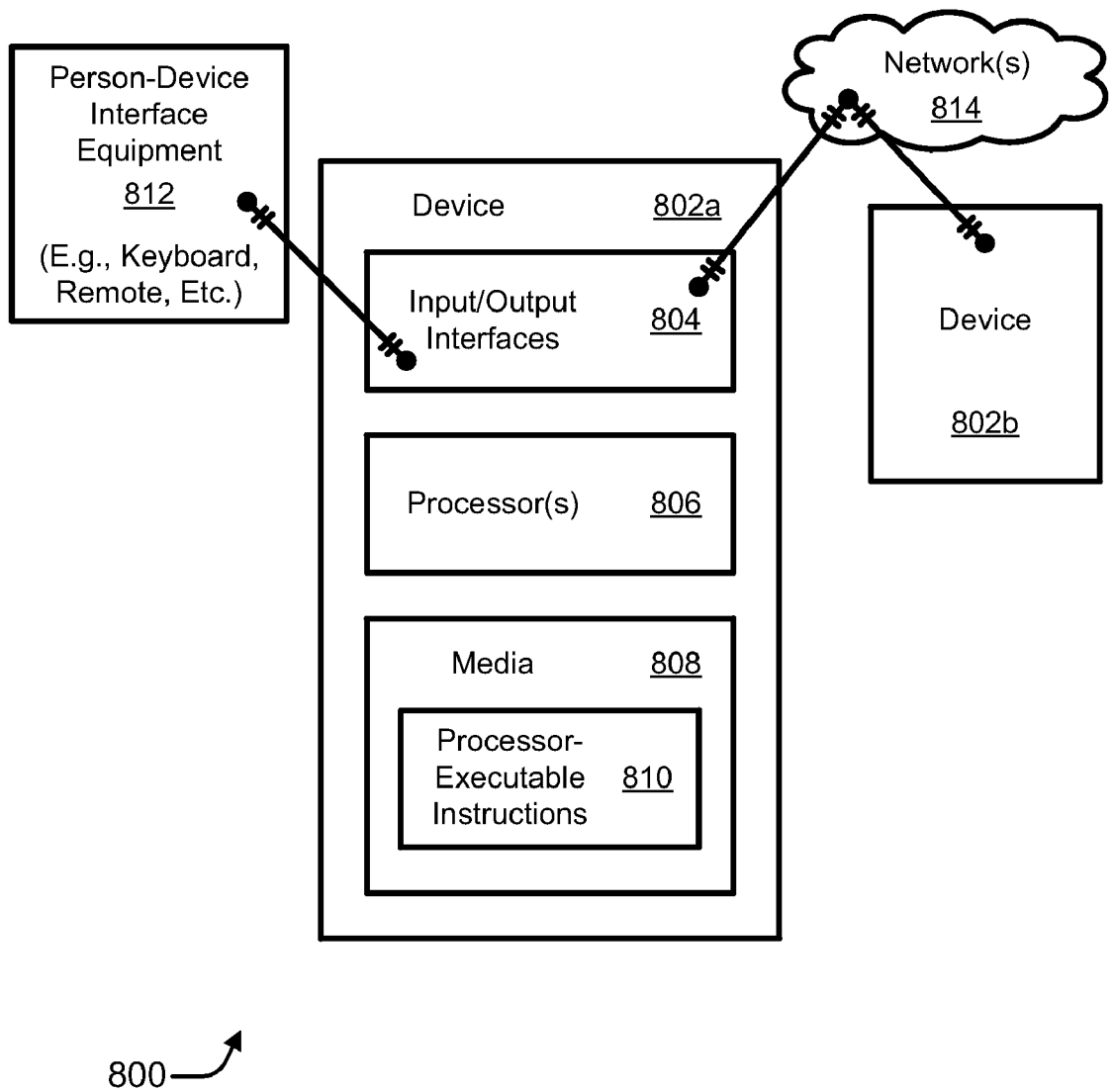
FIG. 8 is a block diagram illustrating example devices that may be used to implement embodiments for network analysis with Steiner trees.

It should be noted that the acts of the various flow diagrams that are described herein may be performed in many different environments and with a variety of different devices, such as by one or more processing devices (e.g., of FIG. 8). The orders in which the methods are described are not intended to be construed as a limitation, and any number of the described blocks can be combined, augmented, rearranged, and/or omitted to implement a respective method, or an alternative method that is equivalent thereto. Although specific elements of certain other FIGS. are referenced in the description of the flow diagrams, the methods may be performed with alternative elements.

For certain example embodiments, starting at block 402, data specifying a network is received as input. For example, data specifying a network 104 may be received as input to network analysis 300. At block 404, Steiner tree parameters are accepted as input. For example, Steiner tree parameters 106 may be accepted as input. Steiner tree parameters 106 may designate terminal vertices 204.

At block 406, a Steiner tree model is created on the data specifying the network responsive to the Steiner tree parameters, with the Steiner tree model including a local representation having a depth constraint for neighborhood vertices. For example, network analyzer 102 may create a Steiner tree model on data specifying a network 104 responsive to Steiner tree parameters 106. The Steiner tree model may include local representation 110 (of FIG. 1) that has a depth constraint for neighborhood vertices.

At block 408, the data specifying the network is analyzed to ascertain a Steiner tree solution (i) based on the Steiner tree model that includes the local representation and (ii) using a locally-oriented combinatorial algorithm. For example, network analyzer 102 may analyze data specifying a network 104 to ascertain Steiner tree solution 108 (i) based on the Steiner tree model that includes local representation 110 and (ii) using a locally-oriented combinatorial algorithm. Examples of Steiner tree models, local representations 110, depth constraints, and locally-oriented combinatorial algorithms that may be utilized are described further herein below with particular reference to FIG. 5.

At block 410, the Steiner tree solution is provided as output of the act of analyzing. For example, the providing may include storing Steiner tree solution 108 in a memory, transmitting Steiner tree solution 108 over a communication link, presenting Steiner tree solution 108, some combination thereof, and so forth. Presenting may include, for instance, displaying, printing, etc. Steiner tree solution 108 to a user.

Figure 5:
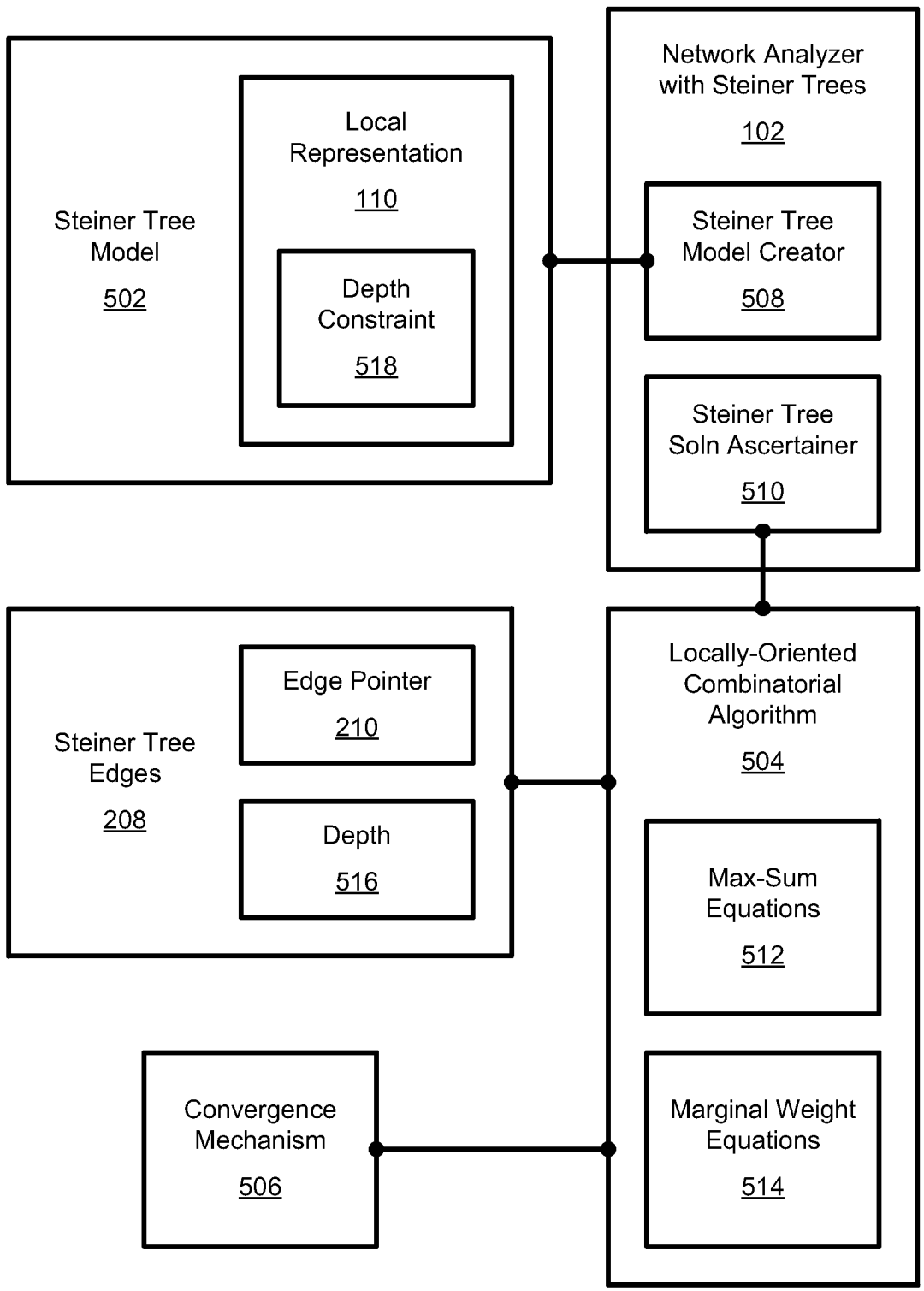
FIG. 5 is a block diagram of a network analysis with Steiner trees that illustrates example operational components.

FIG. 5 is a block diagram of a network analysis 500 with Steiner trees that illustrates example operational components. As illustrated, network analysis 500 includes network analyzer 102 that uses Steiner trees, Steiner tree edges 208, a Steiner tree model 502, a locally-oriented combinatorial algorithm 504, and a convergence mechanism 506. Network analyzer 102 includes a Steiner tree model creator 508 and a Steiner tree solution ascertainer 510. Locally-oriented combinatorial algorithm 504 includes max-sum equations 512 and marginal weight equations 514. Each Steiner tree edge 208 includes an edge pointer 210 and a depth 516. Steiner tree model 502 includes local representation 110, which includes a depth constraint 518.

In an example system embodiment, a system is to analyze networks with Steiner trees. The system may include data specifying a network 104 and Steiner tree parameters 106 (both of FIGS. 1 and 3). The system includes a network analyzer 102 that has a Steiner tree model creator 508 and a Steiner tree solution ascertainer 510. Steiner tree model creator 508 is to create a Steiner tree model 502 on data specifying a network 104 responsive to Steiner tree parameters 106. Steiner tree model 502 is to include a local representation 110 having a depth constraint 518 for neighborhood vertices. Steiner tree solution ascertainer 510 is to analyze data specifying a network 104 to ascertain a Steiner tree solution 108 (of FIGS. 1 and 3) based on Steiner tree model 502, which is to include local representation 110, and using a locally-oriented combinatorial algorithm 504.

Examples of locally-oriented combinatorial algorithms 504 include, but are not limited to, cluster variation (by Kikuchi), survey propagation, neighborhood greedy decision-making, general belief propagation, tree reweighted belief propagation, other variations of belief propagation—including those with convex free energies, a combination or derivative thereof, and so forth. Depth constraint 518 can enable a Steiner tree having global constraints to be modeled with local constraints. The other components introduced in network analysis 500 of FIG. 5 are described further herein below.

As noted above, by creating a Steiner tree model including a local representation, the global Steiner tree problem may be solved using a distributed system and/or a parallel scheme. When an embodiment is implemented as processor-executable instructions, they may be adapted to be executed in parallel and/or with a distributed system. A distributed system may entail multiple threads, a multi-core processor, a multi-processor device, a multiple device system (e.g., coupled over a network), a combination thereof, and so forth. Moreover, a network analysis involving a Steiner tree may be distributed geographically and/or temporally.

Generally, given a graph representing some network, finding a subgraph that "optimizes" some global weight function is a problem that is relevant to many fields. An example version of this problem is known as the Minimum Weight Steiner Tree (MST) problem. As noted above, a particular Steiner tree solution may not provide the actual "minimum" weight or the true "optimum" solution but may nevertheless be considered an acceptable Steiner tree solution.

Given a weighted graph, finding a Steiner tree solution 108 (of FIGS. 1 and 3) entails ascertaining a connected subgraph of "minimum" weight that contains a designated set of terminal vertices 204 (of FIGS. 2 and 3). The weight corresponding to an edge (ij) is denoted by $c_{ij}$. The production of a Steiner tree solution may involve the inclusion of some non-terminal general vertices, which are referred to as the Steiner vertices 206. The sub-graph forming the Steiner tree solution is an actual tree; in other words, cycles are absent from the output of the analysis.

An example network analysis with a Steiner tree that involves an internet multicasting implementation is described below. In this example network multicasting application, there is one source of content (such as video content) that can be represented as a source vertex in a network graph. There are links between many of the nodes in the network. The nodes correspond to and are represented by vertices of the graph, and the links correspond to and are represented by edges of the graph. Routers in a network over which the video content is multicast can also be represented as vertices. From one to many end users can be represented by vertices as well. Users that request delivery of the multicast content may be designated as terminal vertices.

For each link, there is a Quality of Service (QoS) measurement. The QoS may include any of many possible attributes that are associated with the link, such as delay, bandwidth, reliability, length, network charges, combinations thereof, and so forth. A cost can be assigned to each link based on the QoS. The cost corresponds to and may be represented by weights corresponding to the edges. Each path from the source node (e.g., the root vertex) to a user node (e.g., a terminal vertex) can be assigned a cost (e.g., a weight) that is the total of the costs (e.g., weights) corresponding to each link (e.g., edge) included in the path.

A goal is to find an "optimum" solution by interconnecting a subset of the vertices (e.g., at least the terminal vertices) such that a "minimum" of weights is used. In practice, an acceptable solution is ascertained with a heuristic approach in a reasonable period of time. The following describes example embodiments to ascertain acceptable Steiner tree solutions.

Local Representation and the Factor Graph of the Problem

Although embodiments of the invention may be practiced with locally-oriented combinatorial algorithms 504 generally, an example embodiment is described below in the context of a belief propagation algorithm. The belief propagation algorithm, like certain other locally-oriented combinatorial algorithms 504, may be employed to implement a message passing algorithm for analyzing a network with Steiner trees when the Steiner tree is modeled using a local representation 110. In this example, the Steiner tree problem has an arborescent representation. The global constraint of connectivity for the Steiner tree is represented in terms of local constraints. This makes the locally-oriented belief propagation algorithm applicable to the global problems presented by Steiner tree analysis.

It should be noted that belief propagation equations are by construction purely local and that the constraints underlying the Steiner tree problem are global (i.e., ensuring the overall connectivity of the tree is a global problem). An appropriate transformation of belief propagation equations, specifically the so-called max-sum equations 512, enables a set of iterative equations to be derived that can be computed efficiently. This transforms belief propagation into an efficient solver of Steiner tree problems.

The Steiner tree problem is modeled as a rooted tree (such a construction is often associated with the term "arborescence"). Each edge (i, j) (e.g., Steiner tree edge 208) between vertices i and j is associated with a pair of variables $(x_{ij}, d_{ij})$.

The variables $x_{ij} \in \{\pm 1, 0\}$ define a set of arrows that are referred to herein as edge pointers 210. If $x_{ij}=1$, vertex i points to vertex j. If, on the other hand, $x_{ij}=-1$, vertex j points to vertex i. If $x_{ij}=0$, the vertices i and j do not point to each other. Thus, $x_{ij}=0$ if j does not belong to the neighborhood V(i) of i. For a given vertex, each other vertex that has an edge between it and the given vertex is in the given vertex's neighborhood.

Herein, the variable $d_{ij} \in \{0, \ldots, D\}$ represents the depth (e.g., depth 516) of the edge (ij) from the root. This depth 516 relates to the depth of the originating vertex of the pair (i.e., the vertex from which the edge pointer originates as opposed to the distal vertex at the other end of the edge pointer). The depth of the root vertex is set to zero. For the depths of other vertices, a respective depth for a respective vertex is measured by a distance from the root vertex along a unique oriented path from the respective vertex to the root vertex.

To solve the Steiner tree problem, each of the terminal vertices 204 is to point to some other vertex in the final Steiner tree solution 108. Consequently, the associated x variables of each edge pointer 210 of each of the terminal vertices have some non zero entry (e.g., +1 or −1). As noted above, the root vertex conventionally points to itself. Non-terminal general vertices either point to some other vertex in their neighborhood V(i) or do not point to any other vertex. More specifically, if a general vertex is part of the Steiner tree solution 108 (e.g., it is a terminal vertex 204 or a Steiner vertex 206), it points to another vertex in its neighborhood V(i). If a general vertex 202 is not part of the Steiner tree solution 108, it does not point to any vertex in the network's graph (this is permitted for non-terminal general vertices) and is not part of the resulting subgraph.

In example embodiments, to impose a global connectivity constraint for the Steiner tree model 502, the following local condition is imposed: if $x_{ij}=1$, then $d_{ki}=d_{ij}+1$ for any $k \in V(i)$ is imposed. In words, if an edge pointer 210 points from vertex i to vertex j, then the depth 516 for any vertex in the neighborhood of vertex i that points to vertex i is one greater than the depth of vertex i. This depth constraint 518 may be rephrased as: the depth of any given vertex is one more than the depth of the vertex that it points to. If a non-terminal vertex does not point to any other vertex, then there is no constraint on its depth. Alternatively phrased, for a given vertex that points to another vertex, the depth of the given vertex is one less than a depth of each vertex in the given vertex's neighborhood that points to the given vertex. This depth constraint 518 prohibits cycles (a.k.a. loops) and ensures that the selected edges form a tree.

In building equations to implement a locally-oriented combinatorial algorithm 504, example characteristic functions $f_{ij}$ are introduced. These characteristic functions mathematically realize depth constraint 518. They impose depth constraints over configurations of the independent variables $x_{ij}$, $d_{ij}$. An example depth constraint function $f_{ij}$ is shown in equation (1):

$$f_i = \prod_{k \in V(i)} (1 - \delta(x_{ij}; 1)(1 - (1 - \delta(d_{ki}, d_{ij} + 1))(1 - \delta(x_{ki}, 0)))). \quad (1)$$

To enforce depth constraint 518, the characteristic function $f_{ij}$ is checked to ensure that it equals 1 for each vertex i and vertex j. Due to the directionality of edge pointers 210, the characteristic function $f_{ij}$ is not symmetrical. Instead, it depends on the defined direction for edge pointers 210.

Figure 6:
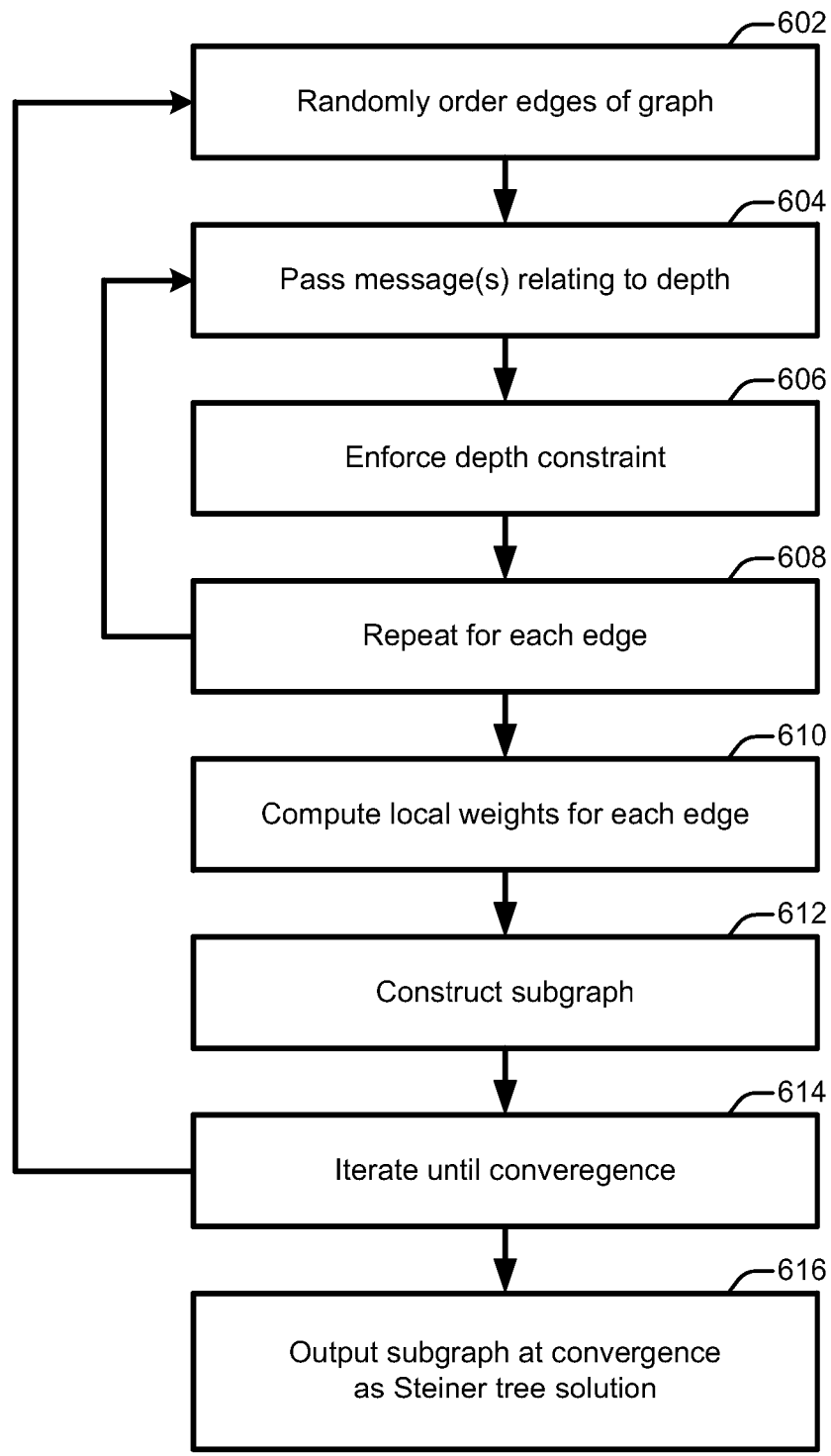
FIG. 6 is a flow diagram that illustrates an example of a qualitative method for performing network analysis with Steiner trees.

FIG. 6 is a flow diagram 600 that illustrates an example of a qualitative method for performing a network analysis with Steiner trees. Flow diagram 600 includes eight blocks 602-616. Implementations of flow diagram 600 may be realized, for example, as processor-executable instructions and/or as part of network analysis 500 (of FIG. 5). Hence, example embodiments for implementing flow diagram 600 are described below with reference to FIG. 5. For certain example embodiments, starting at block 602, edges of the graph are randomly ordered. For example, each of the edges 208 of a graph 200A-200D (of FIG. 2A-2D) may be randomly ordered.

At block 604, for a particular edge, one or more messages relating to depth are passed to one or more other edges. For example, messages may be passed that reflect a particular edge's belief(s) about (i) its depth in the current Steiner tree iteration from a fixed root vertex and (ii) its parent vertex at that depth. Formulation of messages and their communication to neighborhood edges may be effectuated using, for instance, max-sum equations 512. At block 606, a depth constraint is enforced. For example, a depth constraint 518 may be enforced using a characteristic function $f_{ij}$ from equation (1). The depth constraint may also be incorporated into and thus enforced in conjunction with a set of max-sum equations (e.g., max-sum equations 512) that are used to form the messages that are passed to vertices in a given vertex's neighborhood. At block 608, the message passing of block 604 and the depth constraint enforcement of block 606 are repeated for each edge of the graph (in the current ordering).

At block 610, local weights are computed for each edge. For example, local weights may be computed based on marginal weight equations 514. At block 612, a subgraph is constructed. For example, a subgraph may be constructed by selecting edges for inclusion in the subgraph responsive to maximum values from the marginal weight equations.

At block 614, the procedure is iterated until the weights of the subgraph converge. For example, the procedure may be repeated from the act of randomly ordering the edges of the graph until the message passing produces a stable configuration for the subgraph. At block 616, upon convergence, the subgraph is output as the Steiner tree solution. For example, when the marginal weight equations 514 reach convergence, the subgraph may be output as the Steiner tree solution 108.

From Max-Sum to a Distributed Algorithm

This subsection describes additional example details for a belief propagation version in terms of the max-sum equations 512. Messages indicating a belief as to a current depth 516 are passed between each vertex and its neighbors. The form of messages that are sent from vertex i along edge ij are denoted by $\Phi_{i \to j}(x_{ij}, d_{ij})$. This describes the cost change for adding an edge (ij) of weight $c_{ij}$ with a given configuration $x_{ij}, d_{ij}$.

Three equations A, B, and C are introduced. These three equations are: $A_{ij}^d \equiv \Phi_{i \to j}(x_{ij}=1, d_{ij}=d)$, $B_{ij}^d \equiv \Phi_{i \to j}(x_{ij}=-1, d_{ij}=d)$, and $C_{ij} \equiv \Phi_{i \to j}(x_{ij}=0, d_{ij})$. With these three equations, max-sum equations 512 may be expressed as shown below at equations (2a), (2b), (2c), and (2d):

$$A_{ij}^d = \sum_{k \in V(i) \setminus j} \max(C_{ki}, A_{ki}^{d+1} - c_{ki}) + \max_{k \in i \setminus j} \left\{ \begin{array}{c} A_{ki}^{d+1} - c_{ij} - \\ \max(C_{ki}, A_{ki}^{d+1} - c_{ki}) \end{array} \right\} \quad (2a)$$

$$B_{ij}^d = \sum_{k \in V(i) \setminus j c_{ki}} + \max_{k \in V(i) \setminus j} B_{ij}^{d-1} \quad (2b)$$

$$C_{ij} = \max_d \left\{ \sum_{k \in V(i) \setminus j} C_{ki} + \max_{k \in V(i) \setminus j} B_{kj}^{d-1}, \sum_{k \in V(i) \setminus j} C_{ki} \right\} \quad (2c)$$

$$C_{ij}^T = \max_d \left\{ \sum_{k \in V(i) \setminus j} C_{ki} + \max_{k \in V(i) \setminus j} B_{kj}^{d-1} \right\}, \quad (2d)$$

where $C^T$ refers to the update of terminal vertices. The above system of equations may be iterated by interpreting the left hand side (LHS) as the messages at time t resulting from the messages at time t−1 on the right hand side (RHS).

Upon convergence, the messages reach a fixed configuration. From this fixed configuration, the x,d-variables can be extracted from the complete local weights, which are defined as shown below. These marginal weight equations 514 may be expressed as follows at equation (3):

$$\Psi_{ij}(1,d)=A_{ij}^d+B_{ji}^d-c_{ij}, \Psi_{ji}(-1,d)=B_{ij}^d+A_{ij}^d-c_{ij}, \Psi_{ji}(0,d)=C_{ij}+C_{ji}, \quad (3)$$

by choosing the argmax.

From time to time, even after much iteration of the max-sum equations, they may not converge on their own in a given problem instance. However, they may be modified to reach converged solutions in those cases in which the equations might tend to otherwise have a chaotic evolution. In an example embodiment, this modification entails applying a convergence mechanism 506.

In an example implementation, convergence mechanism 506 is implemented using a reinforcement term in the update equations. The reinforcement term adds to the current values of the messages a term proportional to the components of the complete local weight at the previous time step. More specifically, the following terms multiplied by a proportionality constant are added to the four equations: $A_{ij}^d+B_{ji}^d-c_{ij}$, $B_{ij}^d+A_{ji}^d-c_{ij}$, $C_{ij}+C_{ji}$ and $C_{ij}^T+C_{ji}^T$. This produces a set of equations that help provide good convergence properties for a wide range of choices of the proportionality constant. An example implementation of using the reinforcement term having a proportionality constant is described below with particular reference to FIG. 7.

Figure 7:
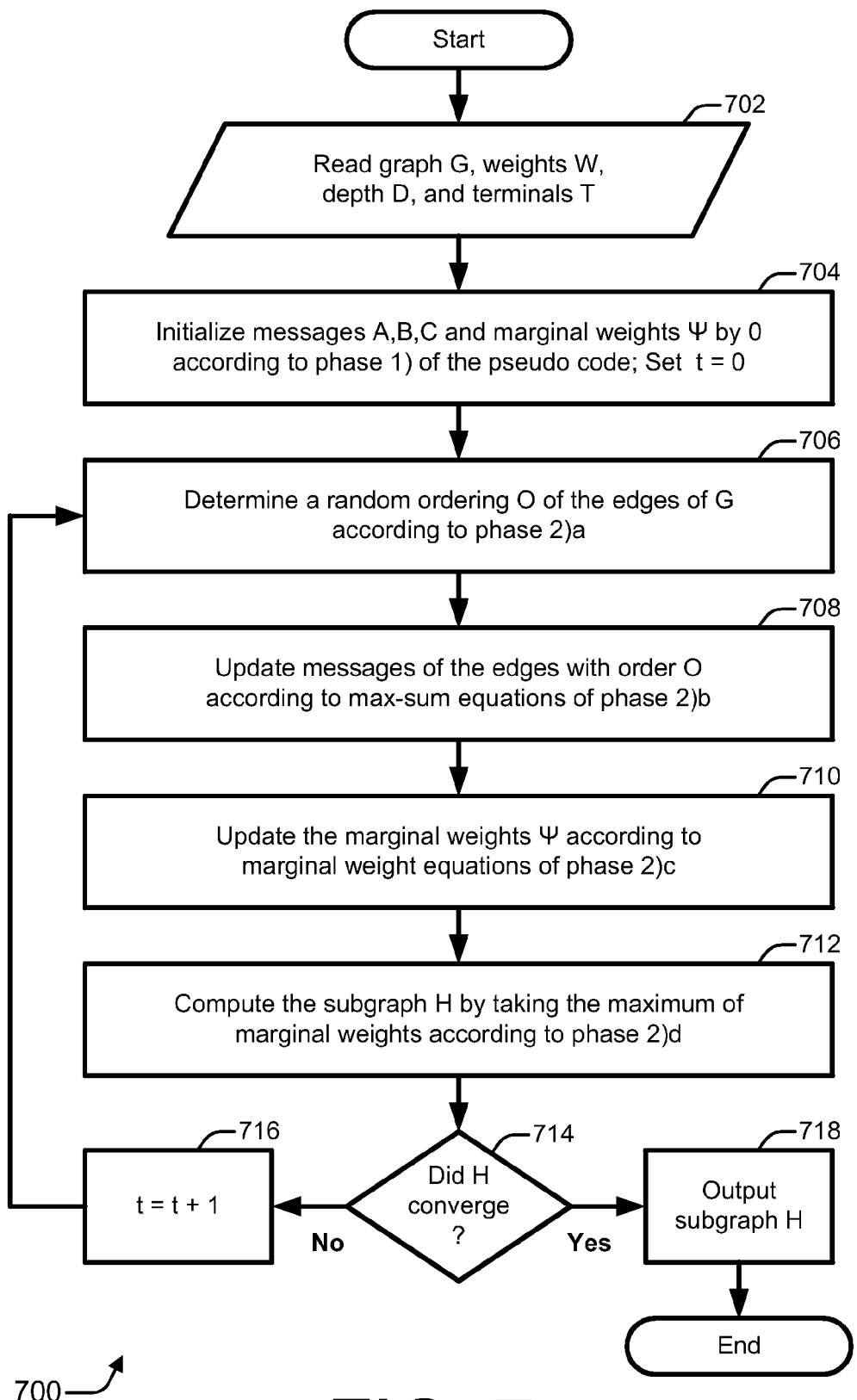
FIG. 7 is a flow diagram that illustrates an example of a quantitative method for performing network analysis with Steiner trees.

FIG. 7 is a flow diagram 700 that illustrates an example of a quantitative method for performing a network analysis with Steiner trees. Flow diagram 700 includes nine blocks 702-718. Implementations of flow diagram 700 may be realized, for example, as processor-executable instructions and/or as part of a network analysis.

Flow diagram 700 is described in terms of the example pseudo-code presented below. The pseudo-code below may be implemented for an example embodiment of network analysis with a Steiner tree.

INPUT: Two n by n arrays G,W representing the graph G and weights c of the edges. A subset of the vertices of G denoted by T for terminals. An integer D between 1 to n−1 for the maximum depth. A real number g between 0 to 1 for a proportionality constant.

1) Initialize two n by n by (D+1) arrays A,B; one 3 by (D+1) array ψ; and one n by n array C by zeros. Also initialize a subgraph of G that is called H by the empty graph.

2) Repeat the following for each t=1,2,3, ... till the subgraph H converges:
   a. Determine a random ordering O of the edges of the graph G.
   b. For each edge (i,j) in O, implement the following max-sum equations:

$$A_{ij}^d = \sum_{k \in V(i) \setminus j} \max(C_{ki}, A_{ki}^{d+1} - C_{ki}) + \max_{k \in i \setminus j} \left\{ \begin{array}{l} A_{ki}^{d+1} - c_{ij} - \\ \max(C_{ki}, A_{ki}^{d+1} - c_{ki}) \end{array} \right\}$$

$$B_{ij}^d = \sum_{k \in V(i) \setminus j C_{ki}} + \max_{k \in V(i) \setminus j} B_{ij}^{d-1}$$

$$C_{ij} = \max_d \left\{ \sum_{k \in V(i) \setminus j} C_{ki} + \max_{k \in V(i) \setminus j} B_{kj}^{d-1}, \sum_{k \in V(i) \setminus j} C_{ki} \right\}$$

$$C_{ij}^T = \max_d \left\{ \sum_{k \in V(i) \setminus j} C_{ki} + \max_{k \in V(i) \setminus j} B_{kj}^{d-1} \right\}$$

Where $A_{ij}^d$ means A(i,j,d) and similarly for B. The variable $C_{ij}^T$ refers to C(i,j) when i is in the set T.
   c. Compute the local weights using the following marginal weight equations:

$\Psi_{ij}(1,d) = g^t(A_{ij}^d + B_{ij}^d - c_{ij}) + (1 - g^t)\Psi_{ij}(1,d) \Psi_{ji}(-1,d) = g^t (B_{ij}^d + A_{ji}^d - c_{ij}) + (1 - g^t)\Psi_{ji}(-1,d) \Psi_{ji}(0,d) = g^t(C_{ij} + C_{ji}) + (1 - g^t)\Psi_{ji}(0,d).$ d. Let the subgraph H be equal to the following: For each edge (i,j), add it to H if and only if $$\max_{a,d} \{\Psi_{ij}(a, d)\}$$

is achieved for a=1 or a=-1.
OUTPUT: Subgraph H.

The variable g in the pseudo-code above is an example implementation of a proportionality constant for the reinforcement terms. The reinforcement terms function as an example convergence mechanism 506. When g=1, the pseudo-code above reduces to a belief propagation algorithm that may not converge in some problem instances. Introduction of the variable g<1 serves to avoid these possible chaotic oscillations and causes the iterative procedure to converge.

With reference to flow diagram 700 of FIG. 7, example embodiments of the pseudo-code may be performed as follows. At block 702, graph G, weights W, depth D, and terminals T are read as input. At block 704, messages A, B, & C and marginal weights v are initialized by 0 according to phase 1) of the pseudo-code above. Also, the time variable t is set to 0.

At block 706, a random ordering O of the edges of G are determined according to phase 2)a of the pseudo-code. At block 708, messages of the edges are updated with ordering O according to the max-sum equations of phase 2)b of the pseudo-code. At block 710, the marginal weights v are updated according to the marginal weight equations of phase 2)c of the pseudo-code. At block 712, the subgraph H is computed by taking the maximum of the marginal weights according to phase 2)d of the pseudo-code.

At block 714, it is determined if the subgraph H has converged. If the subgraph H has not converged, then at block 716 the time variable t is incremented. If, on the other hand, the subgraph H is determined (at block 714) to have converged, then at block 718 the subgraph H is output from the network analysis as a Steiner tree solution.

3: Example Device Implementations for Network Analysis with Steiner Trees

FIG. 8 is a block diagram 800 illustrating example devices 802 that may be used to implement embodiments for network analysis with Steiner trees. As illustrated, block diagram 800 includes two devices 802a and 802b, person-device interface equipment 812, and one or more network(s) 814. As explicitly shown with device 802a, each device 802 may include one or more input/output interfaces 804, at least one processor 806, and one or more media 808. Media 808 may include processor-executable instructions 810.

For example embodiments, device 802 may represent any processing-capable device. Examples of devices 802 include personal or server computers, hand-held electronics, entertainment appliances, network components, some combination thereof, and so forth. Device 802a and device 802b may communicate over network(s) 814. Network(s) 814 may be, by way of example but not limitation, an internet, an intranet, an Ethernet, a public network, a private network, a cable network, a digital subscriber line (DSL) network, a telephone network, a wireless network, some combination thereof, and so forth. Person-device interface equipment 812 may be a keyboard/keypad, a touch screen, a remote, a mouse or other graphical pointing device, a screen, a speaker, and so forth.

I/O interfaces 804 may include (i) a network interface for monitoring and/or communicating across network 814, (ii) a display device interface for displaying information on a display screen, (iii) one or more person-device interfaces, and so forth. Examples of (i) network interfaces include a network card, a modem, one or more ports, a network communications stack, a radio, and so forth. Examples of (ii) display device interfaces include a graphics driver, a graphics card, a hardware or software driver for a screen or monitor, and so forth. Examples of (iii) person-device interfaces include those that communicate by wire or wirelessly to person-device interface equipment 812.

Processor 806 may be implemented using any applicable processing-capable technology, and one may be realized as a general-purpose or a special-purpose processor. Examples include a central processing unit (CPU), a microprocessor, a controller, a graphics processing unit (GPU), an application-specific integrated circuit (ASIC), a derivative or combination thereof, and so forth. Media 808 may be any available media that is included as part of and/or is accessible by device 802. It includes volatile and non-volatile media, removable and non-removable media, storage and transmission media (e.g., wireless or wired communication channels), hard-coded logic media, combinations thereof, and so forth. Media 808 is tangible media when it is embodied as a manufacture and/or as a composition of matter.

Generally, processor 806 is capable of executing, performing, and/or otherwise effectuating processor-executable instructions, such as processor-executable instructions 810. Media 808 is comprised of one or more processor-accessible media. In other words, media 808 may include processor-executable instructions 810 that are executable by processor 806 to effectuate the performance of functions by device 802. Processor-executable instructions 810 may be embodied as software, firmware, hardware, fixed logic circuitry, some combination thereof, and so forth.

Thus, realizations for network analysis with Steiner trees may be described in the general context of processor-executable instructions. Processor-executable instructions may include routines, programs, applications, coding, modules, protocols, objects, components, logic, metadata and definitions thereof, data structures, application programming interfaces (APIs), etc. that perform and/or enable particular tasks and/or implement particular abstract data types. Processor-executable instructions may be located in separate storage media, executed by different processors, and/or propagated over or extant on various transmission media.

As specifically illustrated, media 808 comprises at least processor-executable instructions 810. Processor-executable instructions 810 may comprise, for example, network analyzer 102 (of FIGS. 1, 3, and 5), Steiner tree model 502 (of FIG. 5), a locally-oriented combinatorial algorithm 504 (of FIG. 5), logic implementing the pseudo-code described herein, some combination thereof, and so forth. Generally, processor-executable instructions 810, when executed by processor 806, enable device 802 to perform the various functions described herein. Such functions also include, by way of example but not limitation, those that are illustrated in the various flow diagrams and those pertaining to features illustrated in the block diagrams, as well as combinations thereof, and so forth.

The devices, acts, features, functions, methods, modules, data structures, techniques, components, etc. of FIGS. 1-8 are illustrated in diagrams that are divided into multiple blocks and other elements. However, the order, interconnections, interrelationships, layout, etc. in which FIGS. 1-8 are described and/or shown are not intended to be construed as a limitation, and any number of the blocks and/or other elements can be modified, combined, rearranged, augmented, omitted, etc. in any manner to implement one or more systems, methods, devices, media, apparatuses, arrangements, etc. for network analysis with Steiner trees.

Although systems, methods, devices, media, apparatuses, arrangements, and other example embodiments have been described in language specific to structural, logical, algorithmic, and/or functional features, it is to be understood that the invention defined in the appended claims is not necessarily limited to the specific features or acts described above. Rather, the specific features and acts described above are disclosed as example forms of implementing the claimed invention.

What is claimed is:

1. At least one processor-accessible storage device that includes processor-executable instructions for network analysis with Steiner trees, wherein the processor-executable instructions, when executed by at least one processor, direct a vertex that includes the at least one processor to perform a method comprising:
   receiving data specifying a network wherein the data defines vertices that form the network, the vertices including the vertex;
   accepting Steiner tree parameters that designate terminal vertices included in a Steiner tree solution, wherein the vertices comprise the terminal vertices;
   creating a Steiner tree model on the data specifying the network responsive to the Steiner tree parameters, the Steiner tree model including a local representation having a depth constraint for neighboring vertices of the vertex, the depth constraint ensuring that a depth of any given vertex of the vertices is one more than a depth of another vertex to which the given vertex points; and
   analyzing the data specifying the network to ascertain the Steiner tree solution based on the Steiner tree model that includes the local representation and using a locally-oriented combinatorial algorithm wherein the analyzing includes sending outgoing messages from the vertex to the neighboring vertices and further includes receiving incoming messages at the vertex from the neighboring vertices, wherein each incoming message and each outgoing message includes depth information indicating a tree depth from a root vertex to an originating vertex of the corresponding message and indicating a parent tree depth from the root vertex to a parent vertex of the originating vertex.

2. The device recited in claim 1, wherein the analyzing further comprises utilizing a belief propagation algorithm to ascertain the Steiner tree solution based on the Steiner tree model.

3. The device recited in claim 2, wherein the utilizing further comprises applying a convergence mechanism to the belief propagation algorithm.

4. The device recited in claim 1, wherein at least a portion of the processor-executable instructions are adapted to be executed in parallel on a distributed system.

5. A method implemented by a device to analyze a network with a Steiner tree, the method comprising:
   receiving data specifying the network wherein the data defines devices that form the network, the devices including the device;
   accepting Steiner tree parameters that designate terminal devices included in a Steiner tree solution, wherein the devices comprise the terminal devices;
   creating a Steiner tree model on the data specifying the network responsive to the Steiner tree parameters, the Steiner tree model including a local representation having a depth constraint for neighborhood devices of the device; and
   analyzing the data specifying the network to ascertain the Steiner tree solution based on the Steiner tree model that includes the local representation and using a locally-oriented combinatorial algorithm wherein the analyzing includes sending outgoing messages from the device to the neighboring devices and further includes receiving incoming messages at the device from the neighboring devices, wherein each incoming message and each outgoing message includes depth information indicating a tree depth from a root device to an originating device of the corresponding message and indicating a parent tree depth from the root device to a parent device of the originating device.

6. The method as recited in claim 5, further comprising providing the Steiner tree solution as an output.

7. The method as recited in claim 5, wherein the depth constraint ensures that a depth of any given device of the devices is one more than a depth of another device to which the given device points, and wherein the analyzing further comprises applying a convergence mechanism having a proportionality constant to the locally-oriented combinatorial algorithm.

8. A device to analyze networks with Steiner trees, the device comprising:
   a network analyzer configured to analyze networks with Steiner trees, the network analyzer including a Steiner tree model creator and a Steiner tree solution ascertainer; wherein:
      the Steiner tree model creator is configured to create a Steiner tree model on data specifying a network responsive to Steiner tree parameters, the Steiner tree model comprising a local representation having a depth constraint for neighboring devices of the device, wherein the data defines devices that form the network, and wherein the devices including the device, and wherein the Steiner tree parameters designate terminal devices included in a Steiner tree solution, and wherein the devices comprise the terminal devices; and the Steiner tree solution ascertainer is configured to analyze the data specifying the network to ascertain the Steiner tree solution based on the Steiner tree model and further based on the local representation and further based on a locally-oriented combinatorial algorithm and further based on outgoing messages sent from the device to neighboring devices of the device and further based on incoming messages received at the device from the neighboring devices, wherein each incoming message and each outgoing message includes depth information indicating a tree depth from a root device to an originating device of the corresponding message and indicating a parent tree depth from the root device to a parent device of the originating device.

9. The device as recited in claim 8, wherein the network specified by the data corresponds to a circuit network, a communication network, a biological network, or a distribution network.

10. The device as recited in claim 8, wherein the Steiner tree solution ascertainer applies a convergence mechanism to help the locally-oriented combinatorial algorithm to convergence.

11. The device as recited in claim 8, wherein the local representation having the depth constraint ensures that a given depth of a given device is one less than a depth of each device in a neighborhood of the given device that points to the given device.

* * * * *